(12) United States Patent
Steen et al.

(10) Patent No.: US 7,121,979 B2
(45) Date of Patent: Oct. 17, 2006

(54) POWERTRAIN FOR MOTOR VEHICLE

(75) Inventors: Marcus Steen, Angered (SE); Anders Eriksson, Goteborg (SE); Anders Hedman, Marstrand (SE)

(73) Assignee: Volvo Lastvagnar AB, Göteborg (SE)

( * ) Notice: Subject to any disclaimer, the term of this patent is extended or adjusted under 35 U.S.C. 154(b) by 190 days.

(21) Appl. No.: 10/711,766

(22) Filed: Oct. 4, 2004

(65) Prior Publication Data
US 2005/0026747 A1    Feb. 3, 2005

Related U.S. Application Data

(63) Continuation of application No. PCT/SE03/00503, filed on Mar. 26, 2003, now abandoned.

(51) Int. Cl.
*B60W 10/04* (2006.01)
(52) U.S. Cl. .................................................. 477/111
(58) Field of Classification Search ................ 477/109, 477/110, 107, 111
See application file for complete search history.

(56) References Cited

U.S. PATENT DOCUMENTS

| | | |
|---|---|---|
| 5,679,096 A | 10/1997 | Stine et al. |
| 5,797,110 A | 8/1998 | Braun et al. |
| 5,876,302 A | 3/1999 | Palmeri |
| 6,636,795 B1 * | 10/2003 | Morscheck ................. 701/54 |

* cited by examiner

*Primary Examiner*—Dirk Wright
(74) *Attorney, Agent, or Firm*—Novak Druce & Quigg, LLP

(57) ABSTRACT

Method and arrangement for providing a powertrain (1, 3, 9) for motor vehicles that includes an internal combustion engine (1) and a stagegeared gearbox (9), which has a direct gear and an indirect gear with intermeshing toothed gears (12, 15, 16, 17, 18, 19, 20, 21, 22, 23,). A control element (45, 48) is configured, in response to an input signal indicating that a direct gear is engaged, to be capable of controlling and/or regulating the engine (1) so that the engine can deliver a higher maximum permitted torque than when the direct gear is not engaged. The increase in the maximum permitted torque is allowed when the efficiency of the powertrain (1, 3, 9) with direct gear engaged and increased engine torque is superior to the efficiency of the powertrain (1, 3, 9) when any of the indirect gears (12, 15, 16, 17, 18, 19, 20, 21, 22, 23,) having a lower maximum permitted engine output torque are engaged.

9 Claims, 4 Drawing Sheets

POWERTRAIN FOR MOTOR VEHICLE

CROSS-REFERENCE TO RELATED APPLICATION

The present application is a continuation patent application of International Application No. PCT/SE03/00503 filed 26 Mar. 2003 which was published in English pursuant to Article 21(2) of the Patent Cooperation Treaty, and which claims priority to Swedish Application No. 0201036-1 filed 4 Apr. 2002. Said applications are expressly incorporated herein by reference in their entireties.

FIELD OF THE INVENTION

The present invention relates to a powertrain including an internal combustion engine and a stagegeared gearbox connected to the engine crankshaft by way of a multi-disc clutch. At least one control element is also included which controls and regulates at least the engine.

BACKGROUND OF THE INVENTION

Automatic gearboxes of the automated stagegeared gearbox type are being used more often in heavier vehicles with the increasing development of microprocessor systems. Using a control computer and a number of control devices, for example servomotors, such systems are able to precisely regulate the engine speed, engagement and disengagement of an automatic clutch between the engine and gearbox (and gearbox clutch members in relation to one another) so that smooth gear changes are always achieved at the correct engine speed. One advantage of this type of automatic gearbox, compared to a conventional automatic gearbox made up of planetary gear trains and having a hydrodynamic torque converter on the inlet side, lies partly in the fact that the present system is more simple and robust. Another advantage of the arrangement is that it can be manufactured at substantially lower cost than a conventional automatic gearbox, especially when used in heavy vehicles, and partly in that it affords greater efficiency, especially by way of reduced fuel consumption in the incorporating vehicle.

The development of computer technology has also had an impact on electronic control and feedback systems for a vehicle engine, and as a result, these systems have become more precise, faster and more adaptable to prevailing engine and environmental conditions. Using such technology, substantially the entire combustion process can be precisely controlled according to any operating situation. In this regard, mention should also be made here of various sensors useable for the detection of parameters essential for engine feedback and control.

A manufacturer of internal combustion engines usually optimizes an engine design in order to achieve a certain engine power output, low fuel consumption, good efficiency and high torque. By designing software incorporated into the engine control unit in a certain way, it is possible to precisely determine the appearance of an engine torque and speed curve; that is to say, what maximum torque the engine must be capable of delivering at a certain number of revolutions. This is done, in a supercharged engine (exhaust turbocharger or compressor driven by the crankshaft), for example, by controlling the boost pressure in such a way that a certain maximum torque is obtained at a certain number of revolutions. The design dimensions of the engine hardware naturally imposes purely physical or strength limits on what the engine can, on the whole, deliver. The manufacturer selects a torque and engine speed curve of a certain appearance for a particular engine model, and according to which the engine is allowed to deliver its maximum torque.

If, in driving the vehicle, the engine speed rises or falls to such an extent that the maximum engine torque is insufficient, the vehicle transmission (gearbox) should be shifted up or down so that the engine torque can be better utilized. By means of gearboxes as described above, the gearing between the engine and the vehicle's driving wheels is adjusted so that the engine speed attains a level for which the corresponding maximum torque is sufficient. In this sense, it should be regarded that the engine and the gearbox form the vehicle powertrain.

A stagegeared gearbox usually comprises (includes, but is not necessarily limited to) an input shaft, an intermediate shaft (with at least one toothed gear meshing with a toothed gear on the input shaft), and a main shaft (with toothed gears that mesh with toothed gears on the intermediate shaft). The main shaft is then further connected to an output shaft coupled to the driving wheels, by way of a prop shaft, for example. Each pair of toothed gears has a different gear ratio from another pair of gears in the gearbox. Different transmission ratios are obtained by way of different pairs of gears transmitting the torque from the engine to the driving wheels. Between two interacting and rotating toothed gears in a gearbox, friction losses occur between the teeth of each of the toothed gears which are in engagement.

In some stagegeared gearboxes the highest gear (lowest gear ratio) is a so-called direct gear. This implies that the input shaft and the main shaft (or the output shaft) in the gearbox are directly connected to one another when the direct gear is engaged. This means that the torque is transmitted straight through the gearbox without any gearing. It may alternatively be said that the transmission ratio is 1:1; consequently, no losses occur between meshing gears. An effect of the direct gear is that more fuel-savings is achieved than in the indirect gears, the transmission ratios of which are obtained through the pairs of toothed gears.

Driving a vehicle in a direct gear saves fuel in that friction losses in the gearbox are lower. When the vehicle encounters a sufficiently increased rolling resistance, due to a steeper uphill gradient, for example, or increasing headwind, the vehicle may begin to slow down due to the fact that the maximum torque from the engine is not sufficient to keep the vehicle speed constant.

In order to obtain greater motive force on the vehicle's driving wheels, an automatic stagegeared gearbox will change down to a lower gear (higher gear ratio). Owing to the new higher gearing of the engine torque, the powertrain is aimed to deliver sufficient torque to the driving wheels to be at least capable of maintaining a somewhat slower speed.

The equivalent can be said to occur in the case of brief braking in which the speed reduction does not directly cause down-shift, but the vehicle speed, after braking, is such that the corresponding engine speed and maximum torque with the direct gear engaged are insufficient and the vehicle begins to decelerate and the gearbox will then change down.

While the direct gear can be fuel-saving in this manner, it is usually at the same time also the most powerful from a strength point of view. That is to say, the transmission is capable of transmitting higher torque in the direct gear than in other gears in which the torque is transmitted via the toothing systems on the toothed gears meshing in the gear pair for each particular gear.

U.S. Pat. No. 5,876,302 shows an arrangement in which the engine control unit permits a higher engine output torque when a direct gear in a stagegeared gearbox is engaged. The object according to this arrangement is to utilize the greater strength of the direct gear. As soon as the control unit receives an input signal indicating that a direct gear is engaged, the engine control unit allows a higher maximum permitted drive torque output from the engine.

U.S. Pat. No. 5,679,096 shows an arrangement in which a stagegeared gearbox is equipped with a direct gear and so-called overdrive gears enhanced from the strength standpoint (that is to say overdrive gear in which the transmission ratio between the rotational speed of the gearbox input and output shafts is less than 1:1). In this way, a higher maximum permitted engine output torque can be allowed for the direct gear and the overdrive gears compared to the lower gears. When the control unit receives an input signal indicating that a direct gear or overdrive gear is engaged, the engine control unit allows a higher maximum permitted output drive torque from the engine.

It should be appreciated, however, that driving in a direct gear with an increase in the maximum permitted engine output torque does not necessarily mean that the vehicle will be driven with greater fuel economy than if the vehicle were driven with an indirect gear with a lower maximum permitted engine output torque. Therefore, a need exists to reduce the fuel consumption of a vehicle in which the engine, with a direct gear engaged, can deliver an increased maximum permitted torque. This is the primary object of the invention described below.

SUMMARY OF THE INVENTION

According to at least one embodiment of the present invention, an accordingly configured arrangement relates to a motor vehicle powertrain comprising an internal combustion engine and an input shaft to a stagegeared gearbox connected to the engine crankshaft by way of a multi-disc clutch. The gearbox has at least one direct gear and at least one indirect gear with intermeshing toothed gears. A control element having at least one engine control function is arranged in the vehicle. The control element registers input signals representing the gear selected and various engine and vehicle data, which as a minimum cover the engine speed or revolutions of the input shaft or the vehicle speed. The control element is designed, in response to an input signal indicating that a direct gear is engaged, to be capable of controlling and/or regulating the engine so that the engine can deliver a higher maximum permitted torque than when the direct gear is not engaged. The arrangement is characterized by the fact that the control element is designed to allow the increase in the maximum permitted torque only if the efficiency of the gearbox or powertrain, with the direct gear engaged and increased maximum permitted engine output torque, is superior to the efficiency of the gearbox or powertrain when any of the indirect gears having a lower maximum permitted engine output torque are engaged.

Thus, the increase in the maximum permitted engine output torque with direct gear engaged is only allowed if the vehicle fuel consumption does not increase due to the increase in the torque. If the efficiency with increased engine torque is inferior, the control element elects not to increase the maximum permitted engine output torque with direct gear engaged. Thus the engine output torque will be insufficient and the control element will therefore change down to a gear affording greater efficiency.

The advantage to this is that it achieves greater efficiency of the vehicle; that is to say, a lower overall fuel consumption. The overall efficiency of the vehicle is further improved compared to known systems and arrangements if the efficiency comparison is based on the efficiency of the powertrain. The function in which the efficiencies are compared is suitably integrated into the programmed gear selection strategy of the transmission control unit.

Further advantages of an arrangement that is configured according to the invention are that when the vehicle is driven more with a direct gear engaged, fuel savings are achieved because overall friction losses are lower. This is possible due to the fact that the control element for the engine and gearbox is programmed in such a way that the engine can deliver a higher maximum torque only when a direct gear is engaged. In this way the engine is able to maintain the vehicle speed in many driving situations. The gearbox need not shift down until later, or in some cases not at all if the increased torque continues to suffice for the future rolling resistance. A further advantage is that increased driving with the direct gear engaged gives a longer gearbox service life since no toothed gears in the gearbox are under load when the direct gear is engaged.

According to an advantageous embodiment of the present inventive arrangement, the included control element is designed (configured) to regulate the engine so that the increased maximum torque is applied in one step and/or continuously owing to the fact that the vehicle is not allowed to accelerate through the delivery of extra fuel.

This has advantages in terms both of safety and fuel economy. The increase in the torque is not allowed to deliver a power boost, which can cause the vehicle to surge away. The driver can summon up acceleration only by further depressing the accelerator pedal, or alternatively, by adjusting the setting on the cruise control. Acceleration through the supply of fuel (as distinguished from acceleration due to gravity, for example) can only occur at the normal maximum engine torque; that is to say, not under increased torque. The reason for this is that the engine consumes a relatively large amount of fuel in acceleration at increased maximum torque. By continuously increasing the maximum torque, the increase can be adjusted while underway so that the vehicle does not actually accelerate but does not slow down either. Instead, the engine is able to maintain the speed with the direct gear engaged. One alternative is to increase or reduce the maximum torque in one or more stages. According to an alternative embodiment, the increase in the maximum torque only occurs when the vehicle is decelerating.

According to another advantageous embodiment of an arrangement configured according to the invention is that an increase in the maximum torque only occurs on condition that the mean speed of the vehicle does not increase in comparison to what it would be if the maximum torque were not increased. The advantage to this is that unnecessary speed increases are avoided. In this context, an increased speed means, for example, that the air resistance of the vehicle increases with the square of the corresponding speed increase.

BRIEF DESCRIPTION OF THE DRAWINGS

Hereinbelow, the present invention is described in greater detail with reference to the appended drawings showing preferred embodiments thereof, and in which.

DESCRIPTION OF PREFERRED EMBODIMENTS

Figure 1:
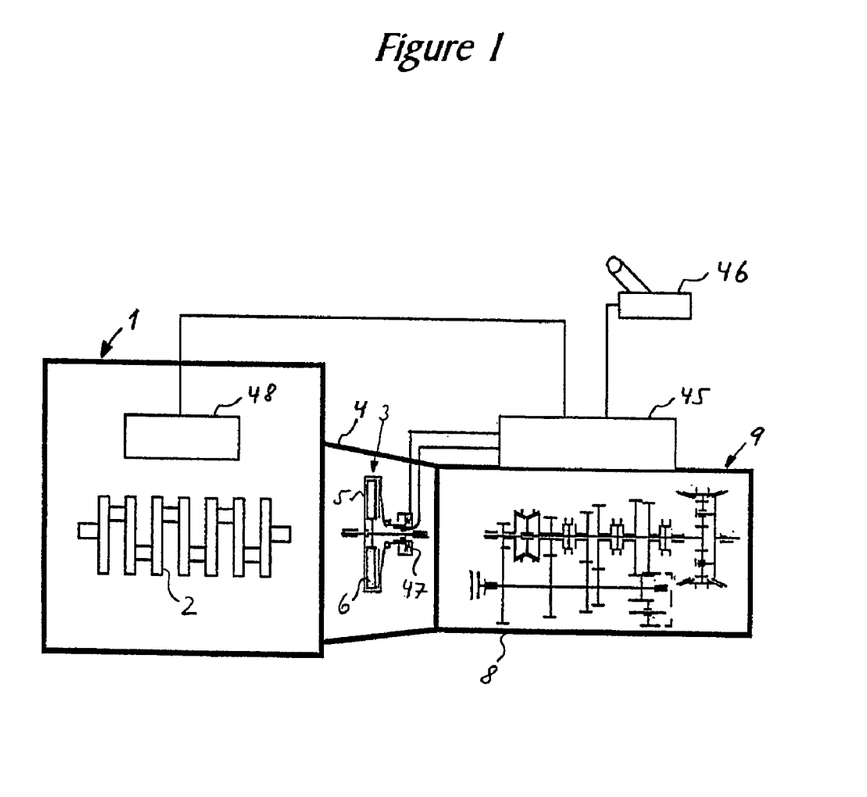
FIG. 1 is a schematic diagram showing an embodiment of a powertrain configured according to the present invention.

In FIG. 1, the reference numeral 1 denotes a six-cylinder internal combustion engine, for example a diesel engine, the crankshaft 2 of which is coupled to a single-plate dry multi-disc clutch generally denoted by 3, which is enclosed in a clutch cover 4. Instead of a single-plate multi-disc clutch a two-plate clutch may be used. The crankshaft 2 is rotationally fixed by way of the engine output shaft 51 (see FIG. 2) to the clutch housing 5 of the clutch 13 while the plate 6 thereof is rotationally fixed to an input shaft 7, which is rotatably supported in the housing 8 of a gearbox generally denoted by 9. A main shaft 10 and an intermediate shaft 11 are also rotatably supported in the housing 8. Also illustrated are an engine control unit 48, a transmission control unit 45 and a manual gear selector 46, coupled to the transmission control unit 45. The transmission control unit 45 and the engine control unit 48 are adapted for communication with one another.

Figure 2:
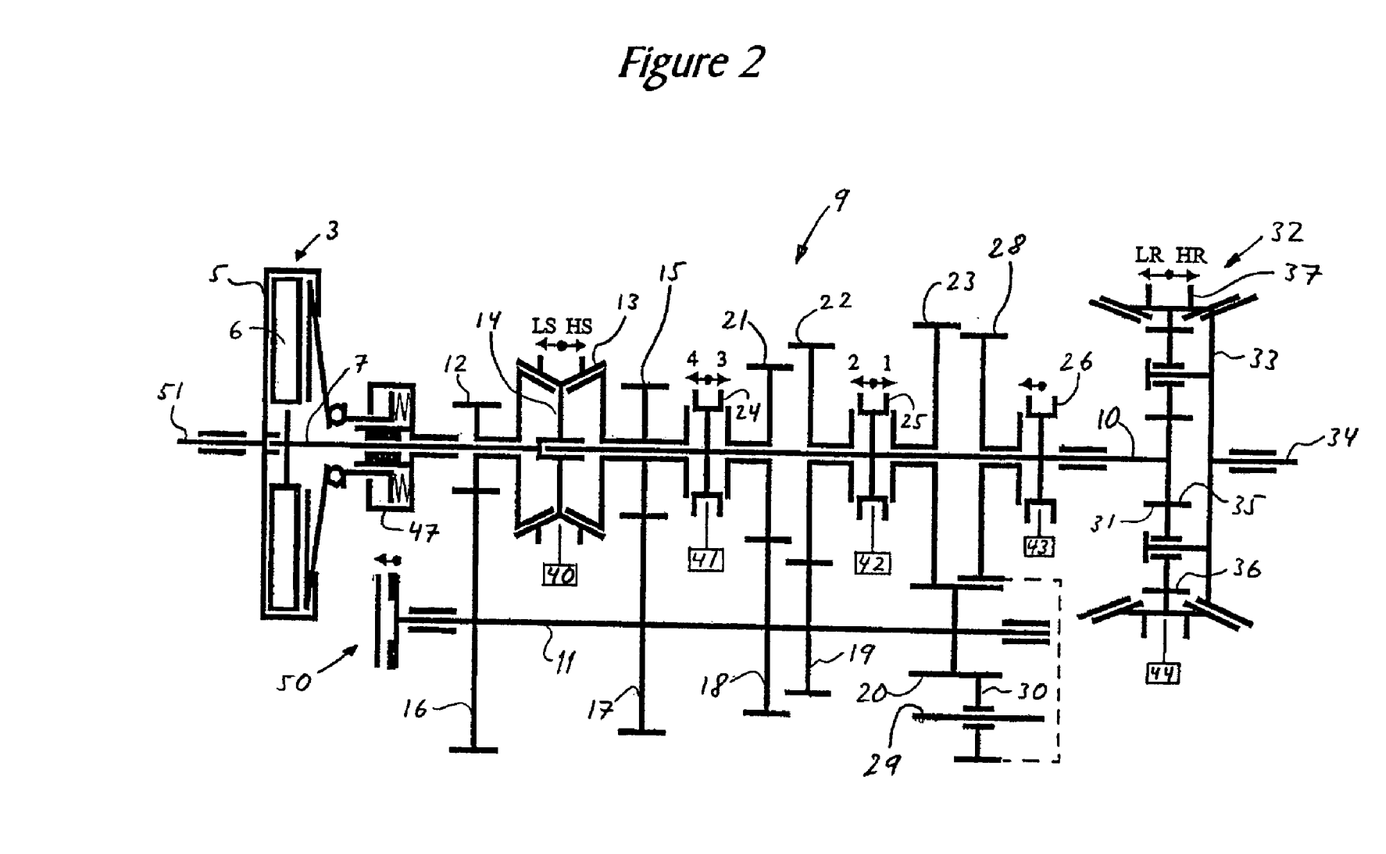
FIG. 2 is a larger scale diagram of the clutch and the gearbox shown in FIG. 1.

As can be most clearly seen from FIG. 2, a gear 12 is rotatably supported on the input shaft 7 and can be locked to the shaft by means of a clutch sleeve 13 provided with synchromesh elements. The sleeve is supported so that it cannot rotate, but is axially displaceable on a hub 14 rotationally fixed to the input shaft. A gear 15, rotatably supported on the main shaft 10, can also be locked in relation to the input shaft 7 by means of the clutch sleeve 13. With the clutch sleeve 13 in a central position, both of the toothed gears 12 and 15 are disengaged from their respective shafts 7 and 10. The toothed gears 12 and 15 mesh with toothed gears 16 and 17, respectively, which are rotationally fixed to the intermediate shaft 11. Rotationally fixed to the intermediate shaft 11 are further toothed gears 18, 19 and 20, which mesh respectively with gears 21, 22 and 23, which are rotatably supported on the main shaft 10 and can be locked to the main shaft by means of clutch sleeves 24 and 25 respectively, which in the exemplary embodiment are shown without synchromesh arrangements. A further toothed gear 28 is rotatably supported on the main shaft 10 and meshes with an intermediate toothed gear 30 which is rotatably supported on a separate shaft 29 and in turn meshes with the intermediate shaft toothed gear 20. The toothed gear 28 can be locked to its shaft by means of a clutch sleeve 26.

The gear pairs 12,16 and 15,17 and the clutch sleeve 13 form a splitter group with a low transmission stage (LS) and a high transmission stage (HS). The gear pair 15, 17, together with the gear pairs 21, 18, 22, 19, 23, 20 and 28, 30 also form a main gearbox with four forward gears and one reverse gear. Rotationally fixed to the output end of the main shaft is a toothed gear 31, which forms the sun gear in a two-speed range transmission of planetary type denoted by 32, the planet wheel carrier 33 of which is rotationally fixed to a shaft 34, which forms the gearbox output shaft. The planet wheel 35 of the range transmission 32 meshes with an annular gear 36, which by means of a clutch sleeve 37 can be locked in relation to the gearbox housing 8 for low range (LR) and in relation to the planet wheel carrier 33 for high range (HR).

The clutch sleeves 13, 24, 25, 26 and 37 are displaceable as indicated by the arrows in FIG. 2, thereby obtaining the transmission stages shown next to the arrows. The displacement is achieved by servo devices 40, 41, 42, 43 and 44 (shown schematically in FIG. 2) which may be pneumatically actuated piston-cylinder arrangements of the type used in a gearbox of the type described above and which is marketed under the tradename GEARTRONIC.

The servo devices 40, 41, 42, 43 and 44 are controlled by a transmission control unit 45 (see FIG. 1), comprising a microprocessor that functions based on signals fed into the control unit and representing various engine and vehicle data covering at least the engine speed, vehicle speed, accelerator pedal position and, where applicable, engine brake off/on, when an electronic gear selector 46 coupled to the control unit 45 is in its automatic shift position. When the selector is in the position for manual shifting, gear shifting is performed at the driver's command via the gear selector 46. The control unit 45 also controls fuel injection; that is to say, the engine speed, as a function of the accelerator pedal position and the air admission to a pneumatic piston-cylinder arrangement 47, by means of which the multi-disc clutch 3 is disengaged or engaged.

In the illustrated embodiment, the direct gear in the gearbox 9 is engaged when gear 4HS is engaged and when the range transmission 32 has the high-range position HR engaged. Gear 4HS is engaged when the clutch sleeve for the splitter group 13 is in its high transmission stage HS and the clutch sleeve 24 locks the gear 15 to the shaft 10; i.e., the clutch sleeve 24 is carried to the left in FIG. 2. When the range transmission 32 is in the high range position HR, the gearbox main shaft 10 is directly coupled to the gearbox output shaft 34. The torque from the engine 1 therefore passes straight through the entire gearbox in that the shafts 51 and 10 are directly coupled together, and the shafts 10 and 34 are also coupled together.

Figure 3:
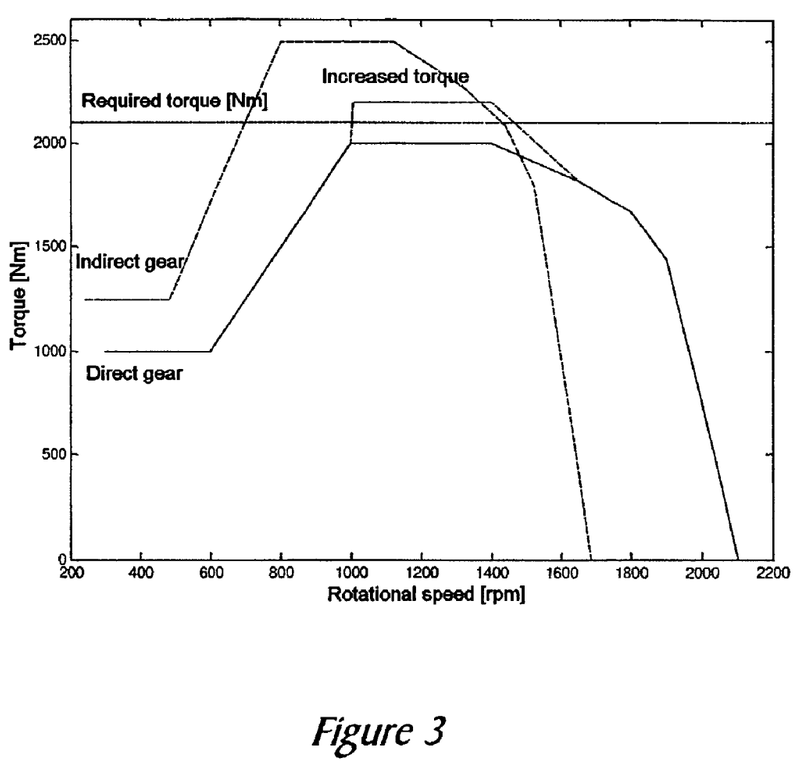
FIG. 3 is a diagram illustrating how the maximum torque varies with the rotational speed of the gearbox output shaft and in which the magnitude of the torque and the rotational speed of the figure are only shown exemplarily.

FIG. 3 shows the necessary torque that is basically required on the gearbox output shaft 34 in order to cope with an assumed rolling resistance. This is shown by the horizontal line (required torque—Nm), which according to the example in FIG. 3, is on the order of approximately 2100 Nm. The rotational speed in FIG. 3 shows the rotational speed of the gearbox output shaft 34. The maximum engine torque normally permitted with the direct gear engaged is illustrated by the curve (direct gear) shown by a solid line, which at 600 rpm shows a maximum of 1000 Nm. In FIG. 3, the normally permitted maximum torque of the engine 1 does not reach the required level. This means that the vehicle will decelerate. It is known for control units 45 of this nature to ensure that the gearbox down-shifts to the next lower gear; that is to say, an indirect gear. By changing down (down-shifting), the engine 1 will be able to deliver a torque curve on the gearbox output shaft 34 corresponding to the curve with a dashed line (indirect gear), which at 400 rpm shows a maximum of 1250 Nm. From the FIG., it can be appreciated that down shifting gives a torque sufficient to cope with the required level if the rotational speed on the gearbox output shaft 34 remains between approximately 700 and slightly more than 1400 rpm. By allowing the engine to deliver an increased torque in accordance with the invention (in this case increased between 1000 and slightly more than 1600 rpm—see the dashed curve issuing from the "direct gear" curve), it is possible, even when the direct gear is engaged, to reach the required level, which in the example is shown between 1000 and slightly more than 1400 rpm. This means that the torque is sufficient to prevent the vehicle from decelerating and the vehicle can therefore continue to be driven in the direct gear, with the commensurate advantage being that fuel will be saved due to the lower friction losses.

Figure 4:
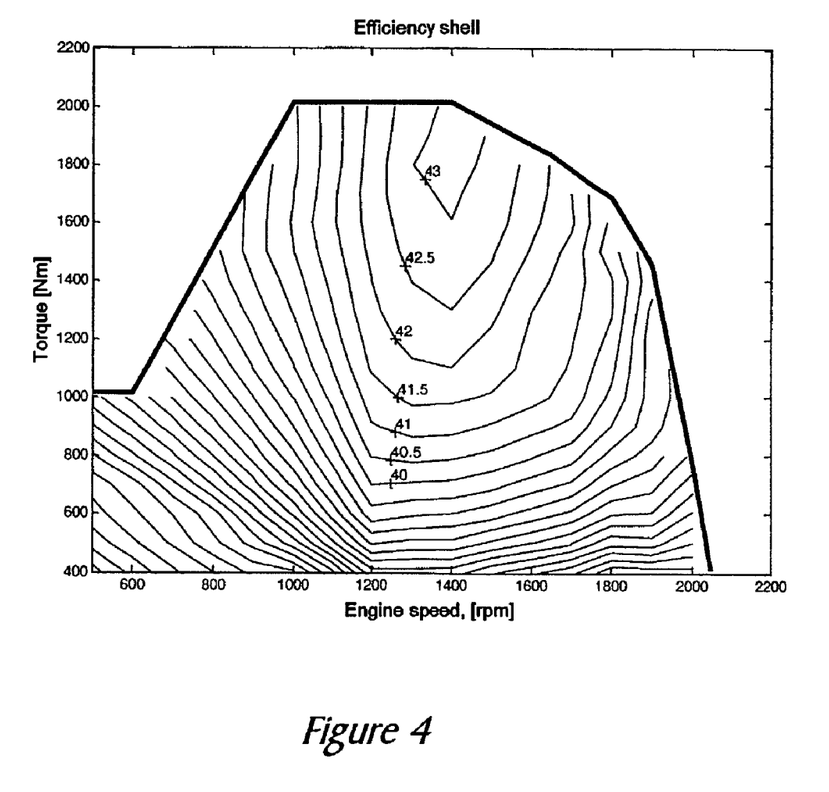
FIG. 4 is a triaxial diagram illustrating how the overall efficiency of an engine varies as a function of the engine torque and engine speed; therein, the magnitude of the efficiency, torque and rotational speed are only exemplarily shown.

FIG. 4 is a diagram basically showing how the overall efficiency of an engine 1 varies as a function of the engine torque and engine speed. It can be seen, for example, that the engine efficiency in the example shown is just over 42.5% at 1400 rpm and 1400 Nm. In this context, the terminology of overall efficiency of a powertrain is utilized to refer to an efficiency of the combination of engine 1 and gearbox 9 in a given driving situation; that is to say, a given speed and given motive force. In driving the vehicle with an indirect gear engaged, an efficiency of approximately two percent (2%) less than driving in a direct gear is achieved. The two percent (2%) reduction stems from losses due to the two "gear tooth engagements" in the gearbox that has been earlier described. Corresponding information to that from the diagram according to FIG. 4 and the two per cent "gear toothing engagement" losses is stored in a memory unit in the transmission control unit 45. By getting the transmission control unit 45, while underway, to continuously compare the overall efficiency of the power train with direct gear engaged and increased maximum engine torque with that which would apply if an indirect gear were engaged, as provided for according to one embodiment of the invention, the transmission control unit 45 controls which gear is to be engaged next time. The comparison can be made with the next lower indirect gear to the direct gear, or with multiple indirect gears, simultaneously. If the overall efficiency for an indirect gear proves to be better than with the direct gear engaged, the transmissions control unit 45 will give an instruction to change down to the indirect gear. If the efficiency is better when the direct gear with increased maximum engine torque is engaged, the direct gear will continue to be engaged.

Alternatively, the efficiency of the gearbox 9 alone can be used instead of the efficiency of the powertrain. This gives a simplified calculation, but also a somewhat inferior basis for the gear selection decision.

The increase in the maximum engine torque when driving in the direct gear can be applied either irrespective of power output limits or as a function thereof. For example, one embodiment can proceed from the assumption that the specified maximum power output of the engine will remain unchanged.

Instead of increasing the maximum torque, the transmissions control unit 45 can be programmed to reduce the maximum torque that the engine 1 can deliver in all indirect gears, while maintaining normal maximum torque in the direct gear.

The functions of the control units 45 and 48 may be performed by a single control unit or by two or more control units.

Still further, the invention is naturally applicable to a gearbox without a splitter group and/or without a range transmission. The invention is furthermore applicable both to automatic stagegeared gearboxes and manual stagegeared gearboxes.

What is claimed is:

1. A powertrain (1, 3, 9) for a motor vehicle, comprising an internal combustion engine (1) and an input shaft (7) to a stagegeared gearbox (9) connected to the engine crankshaft (2) by way of a multi-disc clutch (3), the gearbox having at least one direct gear and at least one indirect gear with intermeshing toothed gears (12, 15, 16, 17, 18, 19, 20, 21, 22, 23,), a control element (45, 48) having at least one engine control function, the control element registering input signals representing the gear selected and various engine and vehicle data, which as a minimum cover the engine speed or revolutions of the input shaft or the vehicle speed, and the control element (45, 48) being configured, in response to an input signal indicating that a direct gear is engaged, to be capable of controlling the engine (1) so that the engine can deliver a higher maximum permitted torque than when the direct gear is not engaged, the control element is further configured to allow the increase in the maximum permitted torque only if the efficiency of the gearbox (9) with direct gear engaged and increased maximum permitted engine output torque is superior to the efficiency of the gearbox (9) when any of the indirect gears (12, 15, 16, 17, 18, 19, 20, 21, 22, 23,) having a lower maximum permitted engine output torque are engaged.

2. A powertrain (1, 3, 9) for a motor vehicle, comprising an internal combustion engine (1) and an input shaft (7) to a stagegeared gearbox (9) connected to the engine crankshaft (2) by way of a multi-disc clutch (3), the gearbox having at least one direct gear and at least one indirect gear with intermeshing toothed gears (12, 15, 16, 17, 18, 19, 20, 21, 22, 23,), a control element (45, 48) having at least one engine control function, the control element registering input signals representing the gear selected and various engine and vehicle data, which as a minimum cover the engine speed or revolutions of the input shaft or the vehicle speed, and the control element (45, 48) being configured, in response to an input signal indicating that a direct gear is engaged, to be capable of controlling the engine (1) so that the engine can deliver a higher maximum permitted torque than when the direct gear is not engaged, the control element is further configured to allow the increase in the maximum permitted torque only if the efficiency of the powertrain (1, 3, 9) with direct gear engaged and increased maximum permitted engine output torque is superior to the efficiency of the powertrain (1, 3, 9) when any of the indirect gears (12, 15, 16, 17, 18, 19, 20, 21, 22, 23,) having a lower maximum permitted engine output torque are engaged.

3. A powertrain (1, 3, 9) for a motor vehicle comprising:
an internal combustion engine (1) and an input shaft (7) to a stagegeared gearbox (9) connected to the engine crankshaft (2) by way of a multi-disc clutch (3), the gearbox having at least one direct gear and at least one indirect gear with intermeshing toothed gears (12, 1 5, 16, 1 7, 1 8, 19, 20, 21, 22, 23,);
a control element (45, 48) having at least one engine control function, the control element registering input signals representing a selected gear and engine and vehicle data, said engine and vehicle data comprising at least one of engine speed, revolutions of the input shaft and the vehicle speed, and the control element (45, 48) being configured, in response to an input signal indicating that a direct gear is engaged, to control the engine (1) to deliver a greater maximum permitted torque compared to the direct gear not being engaged; and
the control element being further configured to allow the increase in the maximum permitted torque only if the efficiency of the powertrain (1, 3, 9) with the direct gear engaged and increased maximum permitted engine output torque is superior to the efficiency of the powertrain (1, 3, 9) when any of the indirect gears (12, 15, 16, 17, 18, 19, 20, 21, 22, 23,) having a lower maximum permitted engine output torque are engaged.

4. The powertrain as recited in either of claims 1, 2 and 3, wherein the control element (45, 48) regulates the engine (1) so that the increased maximum torque is applied continuously so that the vehicle is not allowed to accelerate.

5. The powertrain as recited in either of claims 1, 2 and 3, wherein the control element (45, 48) regulates the engine (1) so that the increased maximum torque is applied in one step and continuously so that the vehicle is not allowed to accelerate.

6. The powertrain as recited in either of claims 1, 2 and 3, wherein the increase in the maximum torque only occurs on condition that the vehicle decelerates with the direct gear engaged and increased torque.

7. The powertrain as recited in either of claims 1, 2 and 3, wherein the increase in the maximum torque only occurs on condition that the mean speed of the vehicle does not increase, in comparison to what it would be if the maximum torque were not increased.

8. The powertrain as recited in either of claims 1, 2 and 3, wherein the higher maximum torque with the direct gear engaged is no more than 10 to 15% higher than the lower maximum torque with an indirect gear engaged.

9. The powertrain as recited in either of claims 1, 2 and 3, wherein the control element (45, 48) comprises an engine control unit (48) and a transmission control unit (45) and the transmission control unit is configured, based on input signals from a gear selector (46), to control the gearbox (9) and the multi-disc clutch (3).

* * * * *

UNITED STATES PATENT AND TRADEMARK OFFICE
CERTIFICATE OF CORRECTION

PATENT NO. : 7,121,979 B2  Page 1 of 1
APPLICATION NO. : 10/711766
DATED : October 17, 2006
INVENTOR(S) : Marcus Steen, Anders Eriksson and Anders Hedman It is certified that error appears in the above-identified patent and that said Letters Patent is hereby corrected as shown below:

At Page 1, please add line (30) as follows:
Foreign Application Priority Data
April 4, 2002 (SE) . . . . . . . . . . . . . .0201036-1

Signed and Sealed this

Twenty-third Day of January, 2007

JON W. DUDAS
*Director of the United States Patent and Trademark Office*